United States Patent [19]
Klein et al.

[11] 3,965,031
[45] June 22, 1976

[54] RED EMITTING PHOSPHORS

[75] Inventors: Richard M. Klein, Framingham; Natansohn Samuel, Sharon, both of Mass.

[73] Assignee: GTE Laboratories Incorporated, Waltham, Mass.

[22] Filed: May 19, 1975

[21] Appl. No.: 578,681

[52] U.S. Cl. .................. 252/301.4 R; 252/301.4 F
[51] Int. Cl.² ....................................... C09K 11/30
[58] Field of Search ............. 252/301.4 R; 313/467, 313/486

[56] References Cited
UNITED STATES PATENTS 3,836,477  9/1974  Lagos ...................... 252/301.4 R X
3,838,060  9/1974  Kaduk ..................... 252/301.4 R X

OTHER PUBLICATIONS

Mochel "J. of the Electrochem. Soc." pp. 398–399, 1966

Jaffe "J. of the Electrochem. Soc." pp. 1203–1205, 1968.

Primary Examiner—Jack Cooper
Attorney, Agent, or Firm—Irving M. Kriegsman

[57]  ABSTRACT

This application relates to red emitting phosphors of the formula $Li_{1-x}Ca_{2x}Al_{5-x}O_8:Fe^{+3}$ or $LiCa_xAl_{5-2x}Si_xO_8:Fe^{+3}$ wherein $0.005 \leq x \leq 0.25$. These phosphors may be used in fluorescent lamps or in cathodoluminescent screens for cathode-ray tubes where red emission is desired.

5 Claims, No Drawings

RED EMITTING PHOSPHORS

FIELD OF THE INVENTION

This invention relates to phosphors which emit red light when exposed to ultraviolet, cathode ray or X-ray radiation.

Phosphors which respond to ultraviolet excitation have utility in low pressure discharge devices such as fluorescent lamps. The emission from such lamps has to range over the entire visible spectrum in order to faithfully render objects of a variety of colors. To achieve this emission, conventional fluorescent lamps contain several phosphors whose combined emission appears white. Most of the commercially useful phosphors have a very small output in the red region of the spectrum and it is, therefore, necessary to incorporate a deep red emitting phosphor in the phosphor blend to correct this deficiency. The material currently used is magnesium fluorogermanate which, as is known, is quite expensive.

Iron-activated lithium aluminate, $LiAl_5O_8:Fe^{+3}$ is another phosphor which emits in the deep red region of the spectrum. However, the emission therefrom is not bright enough to be used in present day phosphor blends. This application describes modifications of this red-emitting phosphor which result in a brighter fluorescence when the modified phosphor is excited by suitable (eg. ultraviolet) radiation.

BRIEF SUMMARY OF THE INVENTION

The modified phosphors of this invention are represented by the formula $Li_{1-x}Ca_{2x}Al_{5-x}O_8:Fe^{+3}$ or $LiCa_xAl_{5-2x}Si_xO_8:Fe^{+3}$ wherein $0.005 \le x \le 0.25$, preferably $0.01 \le x \le 0.20$, and optimally $x = 0.05$. In the first form of the phosphors of this invention, two atoms of calcium are substituted for one atom each of lithium and aluminum. In the second form one atom of calcium and one atom of silicon are substituted for two atoms of aluminum. In each instance, the brightness of the phosphor under ultraviolet excitation is increased, for example on the order of up to about 20–30% or so.

The amount of iron ($Fe^{+3}$) activator is about 0.001 to about 0.013 moles / formula weight of the host $Li_{1-x}Ca_{2x}Al_{5-x}O_8$ or $LiCa_xAl_{5-2x}Si_xO_8$ preferably about 0.004 to about 0.010 moles / formula weight and optimally about 0.0075 mole / formula weight of the host.

The phosphors of this invention can be prepared by blending the appropriate amounts of lithium carbonate, calcium carbonate, silica (if required) and alumina with the iron activator [which can be conveniently added as a solution of a water soluble ferric salt, such as ($FeCl_3 \cdot 6H_2O$)]. The mixture is dried, pulverized and then fired in open crucibles to decompose the starting materials. The mixture is again pulverized and finally fired at a temperature in excess of 1300°C (ie, from about 1300°C to about 1500°C) in covered crucibles and allowed to cool at the natural cooling rate of the furnace. Both firings are performed in air. The crystalline phase obtained using the above conditions is found to be the primitive cubic (non-spinel) phase II of $LiAl_5O_8$ having calcium and optionally silicon substitutions for aluminum as set forth above.

The phosphors of this invention can be finely ground and mixed, if desired, with other luminescent materials to provide a phosphor composition which will emit light of the desired color balance. As is conventional in this art, the resultant phosphor composition can be dispersed in a solution or dispersion of a binder, for example, a binder of one or more known materials which are transparent to the emitted radiation. The resultant compositions can then be coated onto an appropriate surface (such as the inside of a fluorescent lamp or the inside of a cathode-ray tube) and the solvent evaporated therefrom to provide an article which will emit light of the desired color balance (eg, red or white) when excited by suitable (eg. ultraviolet or cathode-ray) radiation.

Such fluorescent lamps can have the structure as shown, for example, in U.S. Pat. Nos. 2,151,496; 3,424,605; 3,424,606; or 3,435,271; the figures of which, and the portions of the specification corresponding thereto, are incorporated herein by reference to the extent necessary to complete this specification. The fluorescent lamps consist of a hermetically sealed tubular glass envelope coated on its inside surface with the phosphor composition which converts the ultra-violet energy of the mercury arc discharge established through the center of the tube into a deep red or visible light, (depending on whether the phosphor of this invention is used singly or in combination with other phosphors), as it is absorbed by the phosphor layer during operation of the lamp. The bases at each end of the tubular envelope support electrical leads which are electrically connected to electrodes at each end of the lamp. The spaced electrodes can be coated with electron-emission promoting materials, such as mixtures of oxides containing a barium oxide, to facilitate operation of the lamp. During operation, a mercury droplet maintained within the sealed envelope is vaporized thereby causing the characteristic mercury discharge. Except for the nature of the phosphor coating, which includes the phosphors of the present invention, construction of the fluorescent lamp is conventional.

The present invention also has applicability to the high pressure mercury vapor lamp shown in FIG. 2 of U.S. Pat. No. 3,435,271. Such a lamp has a radiation-transmitting outer envelope having a conventional screw-type base connected thereto. A coating containing a phosphor of the present invention can be coated on the inner surface of the outer envelope. An arc tube or inner sealed envelope can be supported within the outer envelope by means of a conventional supporting frame. A starting resistor connects a starting electrode to one side of the energizing potential, and, during operation, the mercury arc is sustained within the arc tube between spaced operating electrodes at each end of the arc tube. As with the fluorescent lamp described in the preceding paragraph, the construction of the lamp of this paragraph is conventional, with the exception of the use of the phosphor layer which includes a phosphor of the present invention.

The components of the phosphor-containing compositions, of this invention, including the phosphor, the binder, and the liquid components of the vehicle or carrier, are thoroughly mixed together, flowed over the inner surface of the glass envelope, dried and baked in a conventional manner at a temperature, generally about 600°C, for a few minutes, generally about 1 minute, in a manner sufficient to uniformly coat the phosphor layer onto the glass surface. The tubular envelope is then made into a lamp, in the usual manner, by sealing alkaline earth oxide activated, filamentary tungsten electrodes into the ends thereof, evacuating the envelope, filling the envelope with a small quantity of mercury and a starting gas, such as argon, at a few millimeters pressure, and then sealing the end(s) thereof.

By similar known techniques, the phosphors of this invention can be coated on the surface of a cathode ray tube.

DESCRIPTION OF SPECIFIC EMBODIMENTS

The following Examples are given to enable those skilled in this art to more clearly understand and practice the present invention. They should not be considered as a limitation upon the scope of the invention but merely as being illustrative and representative thereof.

EXAMPLE I 0.7020 G. of lithium carbonate, 0.2002 g. of calcium carbonate and 5.0465 g of gamma alumina are dry blended. Ten ml. of a 0.015M solution of $FeCl_3 \cdot 6H_2O$ is added to this batch and the resultant slurry is wet mixed and dried at 110°C for 8 hours. The batch is prefired in open alumina crucibles at 800°C for 4 hours in air and then fired in covered alumina crucibles at 1400°C for 2 hours in air. The resulting phosphor is a white powder of composition $Li_{0.95}Ca_{0.10}Al_{4.95}O_8:.0075Fe^{+3}$. The structure of the material is primitive cubic and its lattice parameter, $a_o=7.896A$, is equivalent to the unmodified compound ($LiAl_5O_8:.0075Fe^{+3}$). The material emits deep red light when excited by ultraviolet radiation or cathode rays with an emission peak at 675 nm and a half-linewidth of 62nm. A standard 40W fluorescent lamp containing this phosphor radiates 5.561 watts which is equivalent to the commercial magnesium fluorgermanate phosphor.

EXAMPLE II 0.7389 G. of lithium carbonate, 0.1001 g of calcium carbonate, 0.0601 g of silica and 4.9951 g of gamma alumina are dry blended. Activation with ferric iron, drying and firing are performed as in Example I. The white powder obtained has the composition $LiCa_{0.05}Al_{4.90}Si_{0.05}O_8:0.0075Fe^{+3}$ and has the primitive cubic structure with a lattice parameter of $a_o=7.918A$. The material emits deep red light when excited by ultraviolet radiation or cathode rays with an emission peak at 675 nm and a half-linewidth of 62nm.

In a similar manner to the procedure of Examples I and II, using the appropriate amounts of starting materials other phosphors falling within the scope of this invention can be prepared.

EXAMPLE III

The effect of the substitutions of the present invention on the brightness of the $LiAl_5O_8:Fe^{+3}$ phosphors is given in Tables 1 and 2 below. In each case, the fluorescent output is compared against a calcium-less control synthesized at the same time under the same conditions. As can be seen from the data below increases of about 20–30% in emission intensity are observed.

TABLE 1

| x in $Li_{1-x}Ca_{2x}Al_{5-x}O_8:.0075 Fe^{+3}$ | Luminosity (arbitrary units) Under Mercury Vapor Lamp Excitation ($\lambda_{max}=253.7$ nm) |
|---|---|
| 0 | 100 |
| .03 | 124 |
| .05 | 129 |
| .10 | 111 |
| .25 | 87.5 |

TABLE 2

| x in $LiCa_xAl_{5-2x}Si_xO_8:.0075 Fe^{+3}$ | Luminosity (arbitrary units) Under Mercury Vapor Lamp Excitation ($\lambda_{max}=253.7$ nm) |
|---|---|
| 0 | 100 |
| .01 | 108 |
| .03 | 119 |
| .05 | 120 |

While the present invention has been described with reference to specific embodiments thereof it should be understood by those skilled in this art that various changes can be made without departing from its essential teachings.

What is claimed is:

1. A phosphor represented by the formula $Li_{1-x}Ca_{2x}Al_{5-x}O_8 : Fe^{+3}$ or $LiCa_xAl_{5-2x}Si_xO_8 : Fe^{+3}$ wherein $0.005 \leq x \leq 0.25$ and the iron ($Fe^{+3}$) activator is present in about 0.001 to 0.013 moles/formula weight of said $Li_{1-x}Ca_{2x}Al_{5-x}O_8$ or said $LiCa_xAl_{5-2x}Si_xO_8$.

2. The phosphor of claim 1 wherein said phosphor is represented by the formula $Li_{1-x}Ca_{2x}Al_{5-x}O_8:Fe^{+3}$.

3. The phosphor of claim 1 wherein said phosphor is represented by the formula $LiCa_xAl_{5-2x}Si_xO_8:Fe^{+3}$.

4. The phosphor of claim 1 wherein $x$ is 0.05.

5. The phosphor of claim 1 wherein the iron ($Fe^{+3}$) activator is present in about 0.0075 mole/formula weight of said $Li_{1-x}Ca_{2x}Al_{5-x}O_8$ or said $LiCa_xAl_{5-2x}Si_xO_8$.

* * * * *